United States Patent

Ioannides et al.

[11] Patent Number: 5,357,996
[45] Date of Patent: Oct. 25, 1994

[54] PRESSURE REGULATING SYSTEM

[75] Inventors: Antonis C. Ioannides; Alan Pindar, both of Abingdon, Great Britain

[73] Assignee: Oxford GlycoSystems Limited, Abingdon, Great Britain

[21] Appl. No.: 117,982

[22] Filed: Sep. 8, 1993

Related U.S. Application Data

[60] Division of Ser. No. 974,022, Nov. 10, 1992, abandoned, which is a continuation-in-part of Ser. No. 740,512, Aug. 5, 1991, abandoned.

[30] Foreign Application Priority Data

Aug. 18, 1990 [GB] United Kingdom ............... 9018182

[51] Int. Cl.$^5$ .................................... G05D 16/20
[52] U.S. Cl. .................... 137/12; 137/487.5; 137/571
[58] Field of Search .................. 137/12, 487.5, 571

[56] References Cited

U.S. PATENT DOCUMENTS

| | | | |
|---|---|---|---|
| 2,757,067 | 7/1956 | Cornell | 137/12 X |
| 4,253,480 | 3/1981 | Kessel | 137/102 X |
| 4,261,509 | 4/1981 | Anders | 137/487.5 X |
| 4,504,194 | 3/1985 | Holden | 137/571 X |
| 4,690,163 | 9/1987 | Steinemann | 137/487.5 X |
| 4,961,441 | 10/1990 | Salter | 137/487.5 X |
| 5,020,564 | 6/1991 | Thoman | 137/487.5 X |

FOREIGN PATENT DOCUMENTS

0164826 12/1985 European Pat. Off. .
8702414 5/1989 Netherlands .

*Primary Examiner*—Robert G. Nilson
*Attorney, Agent, or Firm*—Spencer, Frank & Schneider

[57] ABSTRACT

A fluid pressure control system comprising a first chamber, the pressure in which is to be controlled, a second chamber and a valve means for controlling communication between the first and second chambers. A controller is arranged such that, if the pressure in the first chamber differs from a required pressure, the controller i) operates the valve means to close off communication between the first and second chambers, ii) varies the pressure in the second chamber, iii) opens communication between the first and second chambers to deliver a discrete pressure step to the first chamber, and, iv) repeats i) to iii) until the pressure in the first chamber reaches a required level.

12 Claims, 7 Drawing Sheets

PRESSURE REGULATING SYSTEM

This application is a division of application Ser. No. 07/974,022, filed Nov. 10, 1992 which is a continuation-in-part of Ser. No. 07/740,512 filed Aug. 5, 1991, now abandoned.

This invention relates to a system which provides a fluid output regulated to a precisely controlled pressure.

SUMMARY OF THE INVENTION

According to the invention there is provided a fluid pressure control system comprising first and second chambers, each such chamber defining a volume, means for varying the pressure in the second volume and means for bringing the two chambers into communication so as to vary the pressure in the first volume.

Preferably, valve means are provided for controlling communication between said chambers, and a controller is arranged such that, if the pressure in the first chamber differs from a desired pressure, said controller,
 i) operates said valve means to close communication between said chambers,
 ii) changes the pressure in said second chamber,
 iii) opens communication between said chambers, and
 iv) repeats steps i) to iii) until the pressure in said first chamber reaches said required level.

The present invention also includes a method of operating a pressure control system to carry out the above steps.

BRIEF DESCRIPTION OF THE DRAWINGS

Embodiments of the invention will now be described, by way of example only, with reference to the accompanying drawings in which.

DESCRIPTION OF THE PREFERRED EMBODIMENTS

Figure 1:
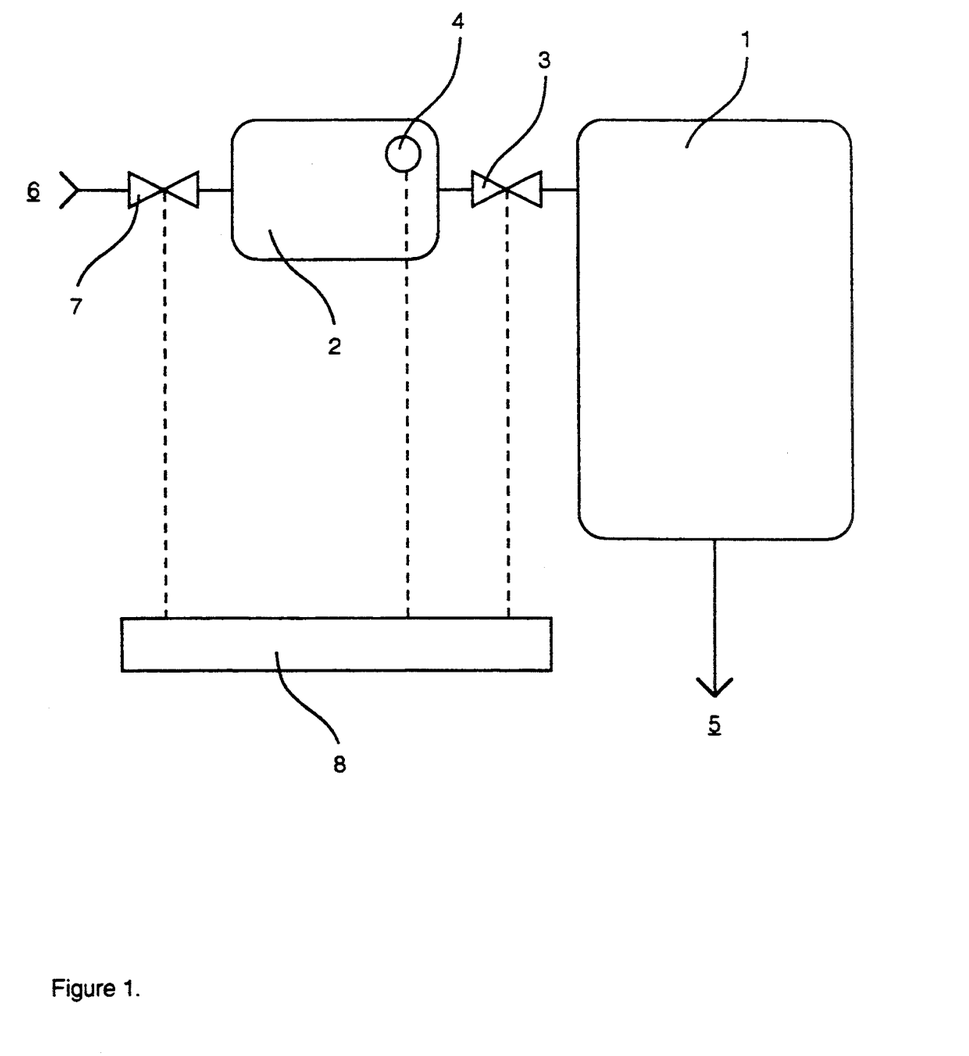
FIG. 1 is a schematic diagram of a pressure control system constructed in accordance with the present invention.

Referring first to FIG. 1, the fluid pressure control system comprises a larger chamber 1 which can be connected to a smaller chamber 2 through a valve 3. If the pressure in the larger chamber 1 falls below a required level, valve 3 is closed and chamber 2 is raised to a pressure higher than the pressure required in chamber 1, valve 3 is then opened and the higher pressure of chamber 2 is discharged into chamber 1. This discharges a pulse or discrete step of pressure into chamber 1 which increases the pressure in chamber 1 by a relatively small amount because chamber 2 is substantially smaller than chamber 1, and so a series of such pulses or steps has to be delivered to chamber 1 to increase its pressure up to the required level.

A pressure transducer 4 is positioned to measure the pressure in the smaller chamber 2 but, when valve 3 is open and the pressures in chambers 1 and 2 equalise, the signal from pressure transducer 4 provides a measurement of the pressure in chamber 1. In an alternative arrangement (not shown) the pressure transducer could be situated in chamber 1 to give a direct, continuous measurement of the pressure in chamber 1.

Chamber 1 is used to supply fluid through an outlet 5 to operate equipment which is not shown in the drawings but which needs a supply of pressure which can be controllably varied as required. Such equipment might, typically, be another fluid container which is required to deliver fluid at a defined rate and therefore needs a precisely controlled pressure supply. When this load requires fluid delivery through outlet 5, the pressure in chamber 1 may begin to fall and, with valve 3 open, this pressure fall will be detected by pressure transducer 4. Valve 3 is then closed and fluid from a high pressure source 6 is passed into chamber 2 by the opening of a valve 7. The pressure in chamber 2 reaches the inlet pressure of source 6, valve 7 is closed and valve 3 is opened, as described above, discharging a pulse or step of pressure into chamber 1.

The pressurised supply from source 6 is substantially unregulated and its pressure is higher than the pressure required in chamber 1 but, obviously, lower than that which can be tolerated by the mechanical parts of the system and by the transducer.

The volume of chamber 2 is relatively small in relation to that of chamber 1, the volumes being in the ratio of about 1:200. This relationship determines the size of the pressure step introduced by each pressure pulse. When valve 3 is opened and the higher pressure of chamber 2 is discharged into chamber 1, the pressure increase in chamber 1 is relatively small, being determined by the relationship below which is significantly influenced by the much larger volume of chamber 1, $$P3 = \frac{(P1 * V1) + (P2 * V2)}{(V1 + V2)}$$

where,
 V1 is the volume of chamber 1
 V2 is the volume of chamber 2
 P1 is the initial pressure in chamber 1
 P2 is the inlet pressure introduced into chamber 2
 P3 is the final common pressure in chambers 1 and 2

However, the steps of,
 i) closing valve 3 when pressure transducer 4 detects a pressure lower than the required level in chamber 1,
 ii) opening valve 7 to allow chamber 2 to reach the inlet pressure,
 iii) closing valve 7,
 iv) opening valve 3 to deliver a small pulse of fluid to chamber 1,
can all be performed relatively quickly, for example once per second. Thus, a series of pressure pulses or steps can be quickly delivered to chamber 1 to increase its pressure up to the required level, to compensate for the delivery of fluid out of outlet 5.

Operation of the system is controlled by a microprocessor control unit 8, shown diagrammatically, which controls the opening and closing of valves 3 and 7 in response to signals received from the pressure transducer 4. Typically, the output pressure, that is the pressure required in chamber 1, is in the range 5 psi to 65 psi, whilst the inlet pressure is about 70 psi.

In this example, the size of chamber 2 is in the ratio 1:200 to the size of chamber 1. However, it is not necessary for there to be such a difference in the sizes of the two chambers. The volume of the chambers can be calculated from the above given equation to provide a required precision in the pulses delivered from one chamber to the other.

Figure 2:
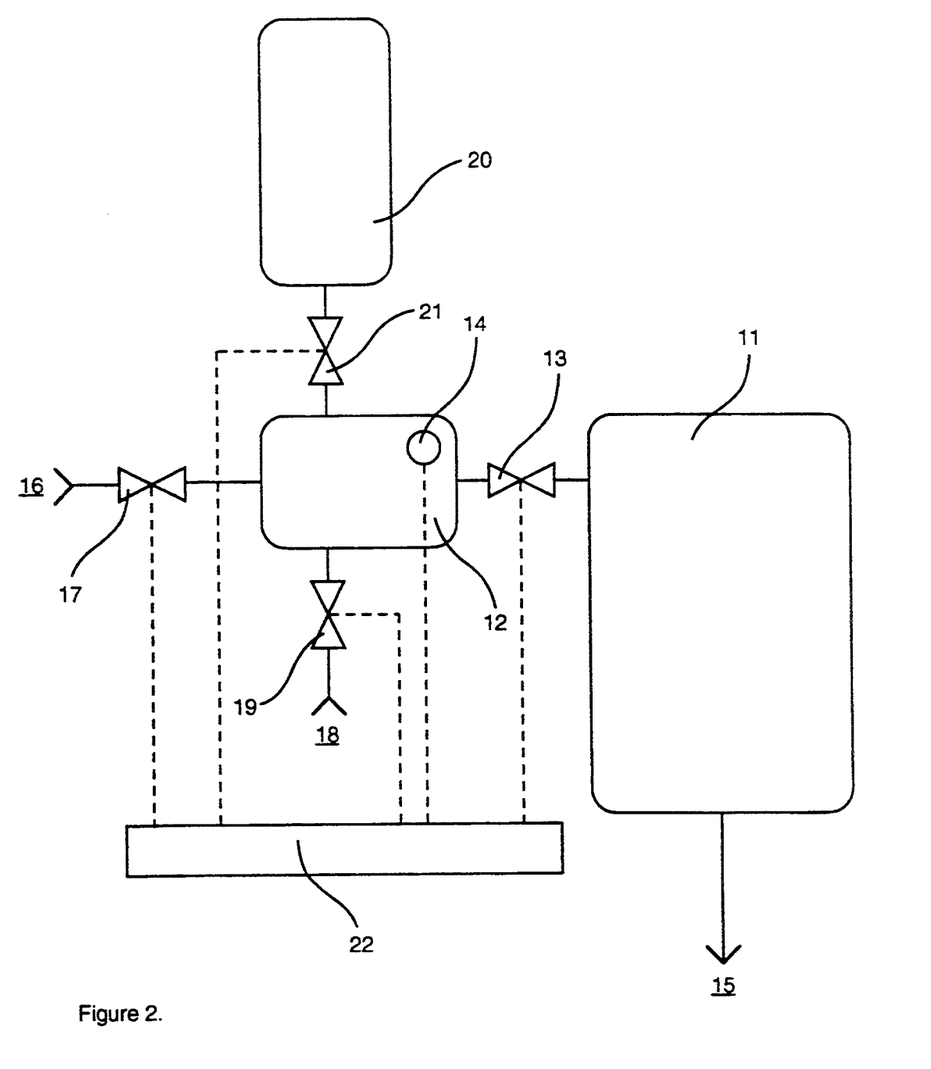
FIGS. 2 and 3 are schematic diagrams similar to FIG. 1, each illustrating a system of increasing complexity.

Referring now to FIG. 2, there is shown a fluid pressure regulating system similar to that of FIG. 1, in that the system comprises a larger chamber 11 which can be connected to a smaller chamber 12 through a valve 13. If the pressure in the larger chamber 11 falls below a required level, valve 13 is closed and the pressure in chamber 12 is raised to a pressure higher than the pressure required in chamber 11, valve 13 is then opened and the higher pressure of chamber 12 is discharged into chamber 11. As with the system of FIG. 1, this pulse or step of pressure increases the pressure in the chamber 11 by a relatively small amount and so a series of such pulses or steps has to be delivered to chamber 11 to increase its pressure up to the required level. Again, as with the system of FIG. 1, chamber 11 supplies pressurised fluid to an outlet 15 and chamber 12 can receive high pressure fluid from a source 16 through a valve 17.

However, in the system of FIG. 2 the pressure in the larger chamber 11 can be either incremented by small steps or decremented by small steps.

If, for any reason, the pressure in chamber 11 is above the required level, the excess pressure will be detected by the pressure transducer 14 and can be reduced. To do this, valve 13 is closed and valve 19 opened to exhaust chamber 12 to waste through an outlet 18 controlled by valve 19. Closing valve 19 and opening valve 13 will then allow fluid to flow from chamber 11 into chamber 12 thus reducing the pressure in chamber 11 by a small amount in accordance with the pressure/volume expression set out above in relation to the arrangement of FIG. 1. Closing valve 13 and opening valve 19 will exhaust chamber 12 through outlet 18 and further small decrements in the pressure in chamber 11 can then be made by first closing valve 19, opening valve 13 to allow fluid to flow from chamber 11 to chamber 12 and closing valve 13 and opening valve 19 to exhaust chamber 12 to waste again through outlet 18. These decremental steps can be performed relatively quickly, for example, once per second, and thus the pressure in chamber 11 can be decreased in a series of small steps down to the required level.

The arrangement shown in FIG. 2 also has a third chamber 20 which can be connected through a valve 21 to chamber 12. This chamber 20 can be used in conjunction with chamber 12 as follows, 1) COARSER CONTROL—Chamber 20 can be used to give coarser control to an increase or decrease of pressure in chamber 11 by allowing larger incremental or decremental steps.

To do this, for example, when an increase in the pressure in chamber 11 is required, chambers 12 and 20 are used together by opening valve 21 and filling both chambers 12 and 20 from source 16. Valve 17 is then closed and valve 13 opened to allow the fluid from chambers 12 and 20 to flow into chamber 11, so that a larger volume of pressurised fluid than if chamber 12 had been used alone, will be delivered to chamber 11. By delivering a series of larger pulses or steps of pressurised fluid in this way a low pressure in chamber 11 can be quickly raised to the required level. Similarly, chambers 12 and 20 can be used together to give larger pressure steps when a decrease in pressure in chamber 11 is required.

In both cases (increase and decrease of pressure), as the required pressure in chamber 11 is approached, the system can then switch back from coarser control to using chamber 12 alone.

2) FINER CONTROL—Chamber 20 can be used to give finer control than using chamber 12 alone, to an increase or decrease in pressure in chamber 11 by allowing smaller incremental or decremental steps.

To do this, when an increase in the pressure in chamber 11 is required, chambers 12 and 20 are first exhausted to waste by closing valves 13 and 17 and opening valves 19 and 21. Valves 19 and 21 are then closed and valve 17 opened to fill chamber 12 from source 16. Valve 17 is then closed and valve 21 opened to allow the fluid from chamber 12 to flow into chamber 20 so that these two chambers 12 and 20 attain an equalised pressure intermediate the high pressure injected into chamber 12 and that in chamber 11.

There are then two alternative ways of proceeding, i) valve 13 can be opened to allow chambers 12 and 20 to communicate with chamber 11 and a pulse or step of pressure will be injected into chamber 11 which will be at lower pressure than when chamber 12 was used alone. Using chamber 20 in this way introduces a change to the expression set out above which now becomes, $$P4 = \frac{(P1 * V1) + (P2 * V2) + (P3 * V3)}{(V1 + V2 + V3)}$$

where,

V1 is the volume of chamber 11
V2 is the volume of chamber 12
V3 is the volume of chamber 20
P1 is the initial pressure in chamber 11
P2 is the inlet pressure introduced into chamber 12
P3 is the initial pressure in chamber 20
P4 is the final common pressure in chambers 11, 12 and 20.

ii) valve 21 can be closed so that when valve 13 is opened only chamber 12 communicates with chamber 11 and in this way the volume of fluid available to form the pulse or step injected into chamber 11 will be smaller, giving a smaller increment than with i) above.

Even finer control can be achieved by successively, emptying chamber 12 to exhaust through valve 19, closing valve 19, and opening valve 21 to allow the pressures in chambers 12 and 20 to equalise and then opening valve 21 to empty chamber 12 to exhaust again. This can be done several times before opening communication with chamber 11.

Operation of the system is controlled by a microprocessor control unit 22, shown diagrammatically, which controls the opening and closing of valves 13, 17, 19 and 21 in response to signals received from the pressure transducer 14.

Outlet 18 is usually discharged to atmosphere but, in some applications, it may be preferred to exhaust outlet 18 to a vacuum.

Figure 3:
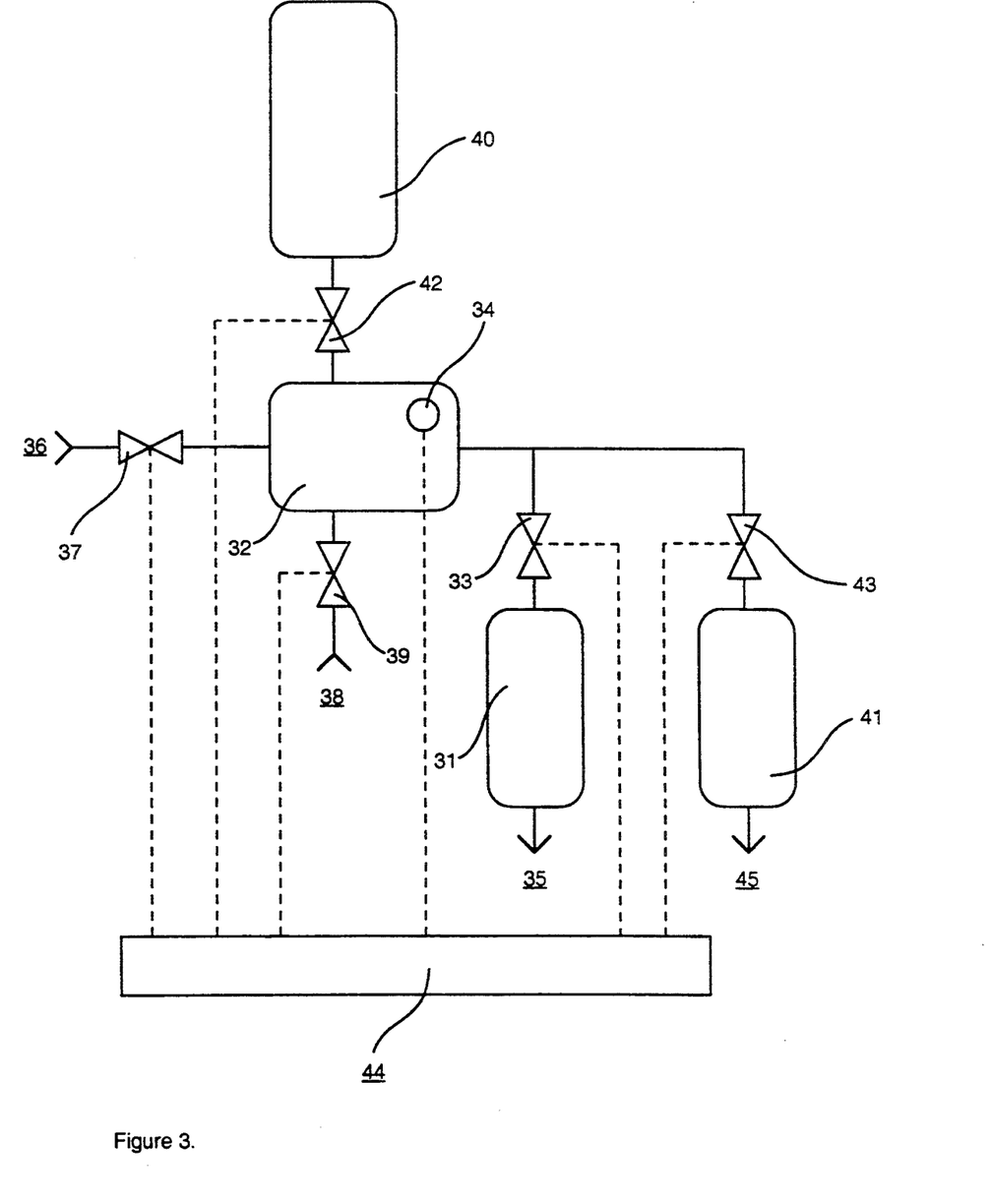

Referring now to FIG. 3 there is shown a fluid pressure regulating system having the same elements as the systems shown in FIGS. 1 and 2, in that a larger chamber 31 can be connected to a smaller chamber 32 through a valve 33. If the pressure in the larger chamber 31 falls below a required level, valve 33 is closed and chamber 32 is raised to a pressure which is higher than that required in chamber 31, valve 33 is then opened and the higher pressure of chamber 32 is discharged as a pulse or step into chamber 31. As with the systems of FIGS. 1 and 2, this pulse of pressure increases the pressure in the larger chamber 31 by a relatively small amount and so a series of such pulses has to be delivered to chamber 31 to increase its pressure up to the required level.

A pressure transducer 34 is positioned to measure the pressure in the smaller chamber 32 but, when valve 33 is open and the pressures in chambers 31 and 32 equalise, the signal from pressure transducer 34 provides a measurement of the pressure in chamber 31.

Again, as with the systems of FIGS. 1 and 2, chamber 31 supplies pressurised fluid to an outlet 35 and chamber 32 can receive high pressure fluid from a source 36 through a valve 37. Chambers 31 and 32 have the same size relationship as in the systems of FIGS. 1 and 2.

The system shown in FIG. 3 has two fluid outputs. In addition to chamber 31, the system can provide a second precisely controlled pressure output 45 from a chamber 41 and this can be at a different pressure from the pressure of output 35. If the pressure in the chamber 41 falls below its required level, valve 43 is closed and the pressure in chamber 32 is raised to a pressure which is higher than the pressure required in chamber 41, valve 43 is then opened and the higher pressure of chamber 32 is discharged into chamber 41. As with the systems described above, this pulse or step of pressure increases the pressure in the larger chamber 41 by a relatively small amount and so a series of such pulses has to be delivered to chamber 41 to increase its pressure up to the required level.

Operation of the system is controlled by a microprocessor control unit 44 shown diagrammatically, which controls the opening and closing of valves 33, 37, 39, 42 and 43 in response to signals received from the pressure transducer 34. When there is a demand for or excess of fluid in either chamber 31 or chamber 41, the control unit 44 will cause pulses of pressure to be delivered to or removed from these two chambers by interleaving the pulses in whatever the logic of the software of unit 44 deems to be the most efficient manner.

In the operation of the systems shown in FIGS. 1, 2 and 3, the control units receive information on pressures, volumes and the number of pressure pulses delivered and are able to deduce flow information and can give a read-out of flow rate and total flow. The control units are able to select the coarser pulses when a large pressure difference exists and then switch to the finer pulses as the required pressure is neared. At any one time the control unit can predict the pressure increment or decrement which one pulse will cause, using the pressure/volume relationships set out above, and, when the pressure in the larger chamber is close to the required pressure, it will allow a pulse to be delivered only when the resultant deviation from the required pressure will be a minimum.

The pressure control systems described here are all simple in construction with few moving parts, mostly just the valves, so that assembly and maintenance is relatively low cost. In particular, the valves are on-off valves of simple construction.

The arrangement shown in FIG. 3 also has a third chamber 40 which can be connected through a valve 42 to chamber 32. This chamber 40 can be used in conjunction with chamber 32 in the same way as described above in relation to FIG. 2, to produce coarser or finer control to the production of pulses of pressure.

Figure 4:
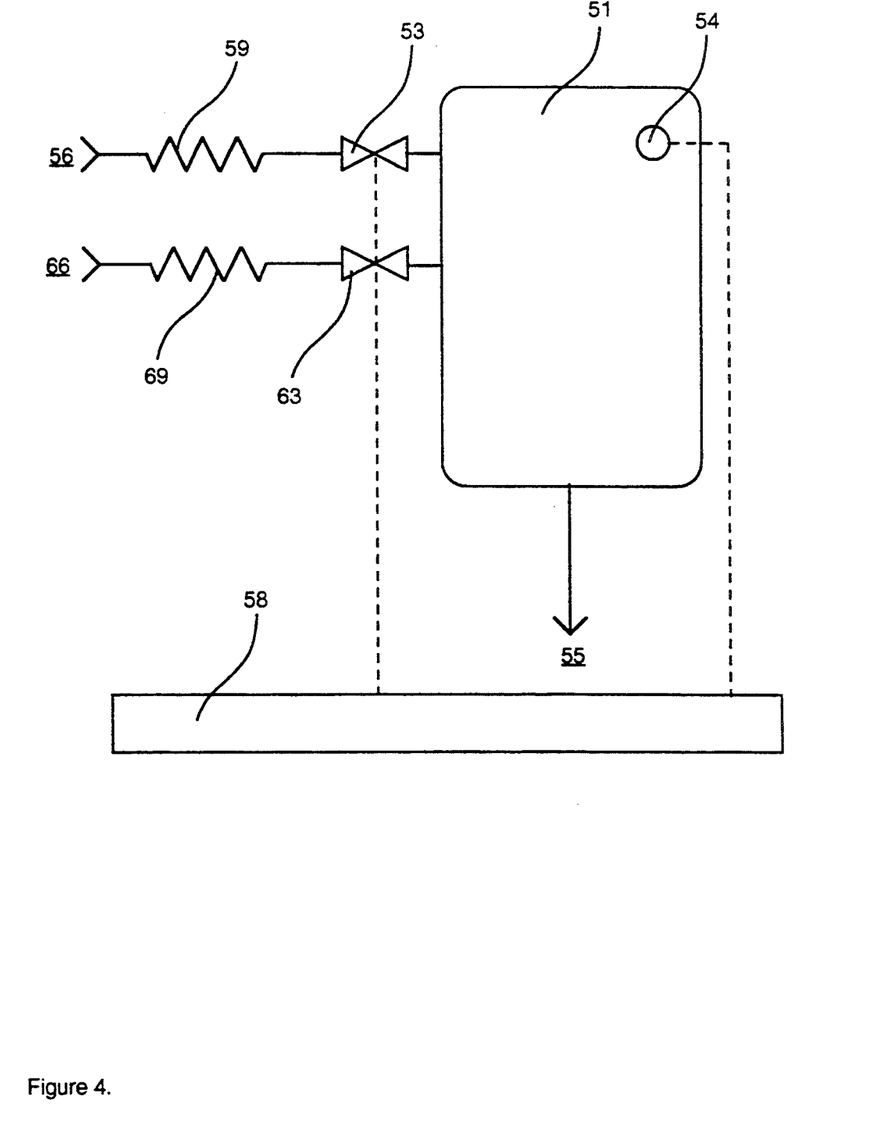
FIGS. 4, 5 and 6 are schematic diagrams of other pressure control systems constructed in accordance with the present invention, and, FIG. 7 is a schematic diagram of a further pressure control system.

Referring now to FIG. 4, there is shown a fluid pressure control system comprising a chamber 51 which is used to supply fluid through an outlet 55 to operate equipment, which is not shown in the drawings, but which needs a pressure supply which can be varied as required.

The pressure in chamber 51 is measured by a transducer 54 which is connected to a microprocessor controller 58. The degree of restriction provided by restrictors 59 and 69 is defined together with the volume of chamber 51. They are arranged to give defined time constants for the pressurisation and de-pressurisation of the chamber 51 respectively. The restrictor values are selected to provide, at the lowest supply pressure, sufficient fluid flow at the final system output. The time constant is altered by selecting the volume of the chamber 51.

To increase the pressure within chamber 51 to a required value, valve 53 is opened. This allows fluid to flow through restrictor 59 and enter the chamber 51. When the pressure measured by transducer 54 has passed a defined boundary close to the required pressure, valve 53 is closed. Pressure within the chamber 51 is allowed to settle for a short time as the temperature will decrease due to gas expansion. The actual pressure is then remeasured by transducer 54.

The pressurisation and de-pressurisation time constants are chosen such that the maximum rate of pressure change is slow enough to ensure a stable control system. That is, when the pressure has reached the defined boundary any delay in switching the valves will not allow the pressure to increase above the required value.

Since the time constant for the system is known and the difference between the actual pressure and the required pressure is determined, valve 53 can be pulsed open for a time which is predicted to bring the chamber 51 to the required pressure. Any subsequent changes or error may be compensated for in the same way. Reduction in pressure is achieved in a similar way using valve 63 and restrictor 69. This method of operating prolongs valve life as the number of valve cycles to reach a given pressure is usually two or three. The method also operates under a wider range of inlet pressures.

Figure 5:
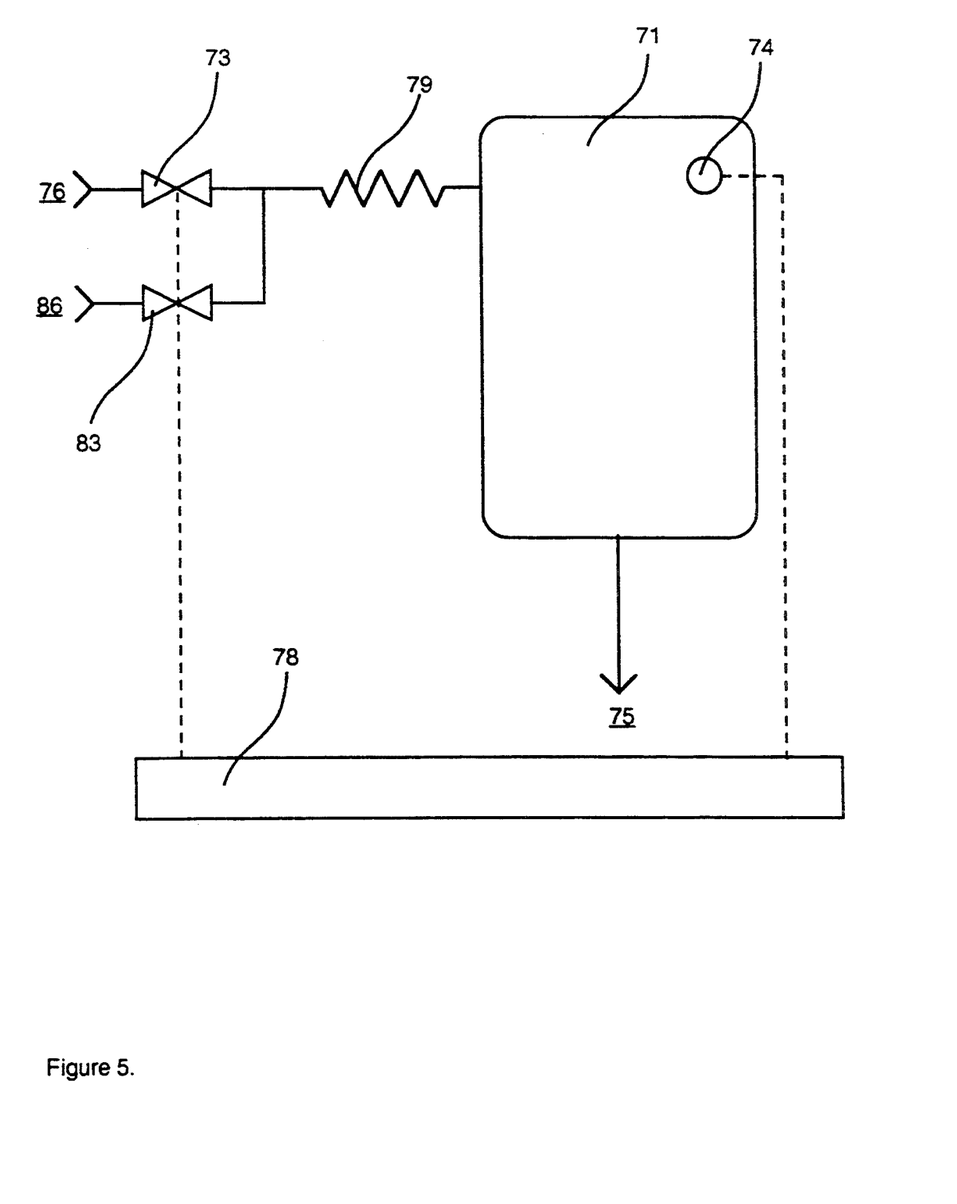

Referring now to FIG. 5, there is shown a fluid pressure control system comprising a chamber 71 which is used to supply fluid through an outlet 75 to operate equipment, which is not shown in the drawings, but which needs a supply the pressure of which can be varied as required. The pressure in chamber 71 is measured by a transducer 74 which is connected to a controller 78. In controlling the pressure in chamber 71, if this pressure is below the required level, controller 78 opens valve 73 to cause a pulse or step of high pressure fluid from a source 76 to flow through a restrictor 79 into the chamber 71 and, if the pressure in chamber 71 is above the required level, controller 78 opens valve 83 to allow a pulse or step of fluid to flow from chamber 71 to exhaust 86 through the restrictor 79. The restrictor 79 restricts the rate of flow into and out of the chamber 71 depending on the pressure difference across it.

The two similar arrangements of FIGS. 4 and 5 differ in that in the arrangement of FIG. 4, valves 53 and 63 are disposed between their respective restrictors 59, 69 on the one hand and chamber 51 on the other, whereas in the arrangement of FIG. 5, the restrictor 79 is disposed between valves 73, 83 on the one hand and chamber 71 on the other.

The flow through a restrictor, which can be likened to a small hole, is dependent on its size and the pressure drop across it and, when pressure is cut off, the pressure drop existing at that time across the restrictor will take a finite time to decay and a small amount of fluid flow will occur until there is no pressure difference across the restrictor.

In the arrangement of FIG. 5 this occurs, so that when valve 73 or valve 83 is shut a small amount of flow continues either into or out of chamber 71 whilst the pressure difference across restrictor 79 decays. However, in the arrangement of FIG. 4, when valve 53 or valve 63 is shut, because the respective valve is positioned next to the chamber 71, flow into or out of chamber 51 will cease immediately.

Figure 6:
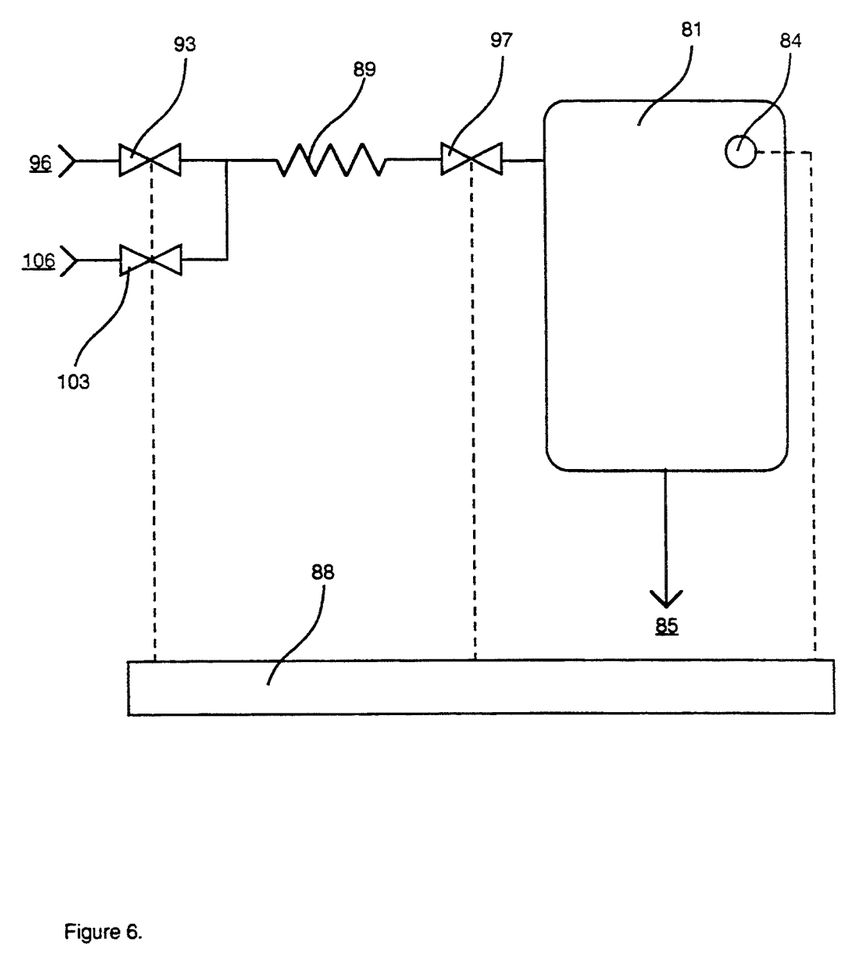

With the arrangements shown in both FIGS. 4 and 5 there is a further finite time after the respective pressure transducer 54, 74 detects that the pressure in its chamber has reached the required level and before the control system can close the valve. During this time the pressure will continue to change and so will overshoot the required level before flow ceases. The restriction provided by restrictor 59, 69 or 79 must so restrict flow as to limit this overshoot to within the design limits of the system, whilst not restricting the flow to lower than that required to supply the load. A restrictor can actually be formed as a length of relatively narrow pipe which is long enough to provide the required restriction to flow through it. FIG. 6 shows an arrangement similar to that of FIG. 5, of a fluid pressure control system comprising a chamber 81 which is used to supply fluid through an outlet 85 to operate equipment, which is not shown in the drawings, but which needs a supply the pressure of which can be varied as required.

The pressure in chamber 81 is measured by a transducer 84 which is connected to a controller 88. In controlling the pressure in chamber 81, if this pressure is below the required level, controller 88 opens valve 93 to cause a pulse or step of high pressure fluid from a source 96 to flow through a restrictor 89 into the chamber 81 and, if the pressure in chamber 81 is above the required level, controller 88 opens valve 103 to allow a pulse or step of fluid to flow from chamber 81 to exhaust 106 through the restrictor 89. The restrictor 89 varies the rate of flow into and out of the chamber 81 depending on the pressure difference across it. In the arrangement of FIG. 6, an additional valve 97 is arranged between restrictor 89 and chamber 81 and the closing of this valve cuts off flow between restrictor 89 and chamber 81 preventing the decaying flow through the restrictor 89 from causing an overshoot of pressure in the chamber.

An additional advantage of the arrangement of FIG. 6 can be utilised when a large pressure difference below the required pressure exists in chamber 81. First valves 93 and 97 can be opened to allow fluid to flow from source 96 to chamber 81 through restrictor 89 until the pressure in chamber 81 nears the required level. Then, provided the restrictor 89 and the system pipework adjacent it have a volume of the order of 1:200 in relation to the volume of chamber 81, the system can be operated in a fashion similar to the operation of the embodiment of FIG. 1. Thus, restrictor 89 and its associated pipework can be supplied with fluid from source 96 with valve 93 open and valve 97 shut. Then valve 93 can be closed and valve 97 opened to allow a pressure pulse or step to be delivered to chamber 81. Thus, a series of pulses can be delivered to chamber 81 to bring its pressure up to the required level.

Figure 7:
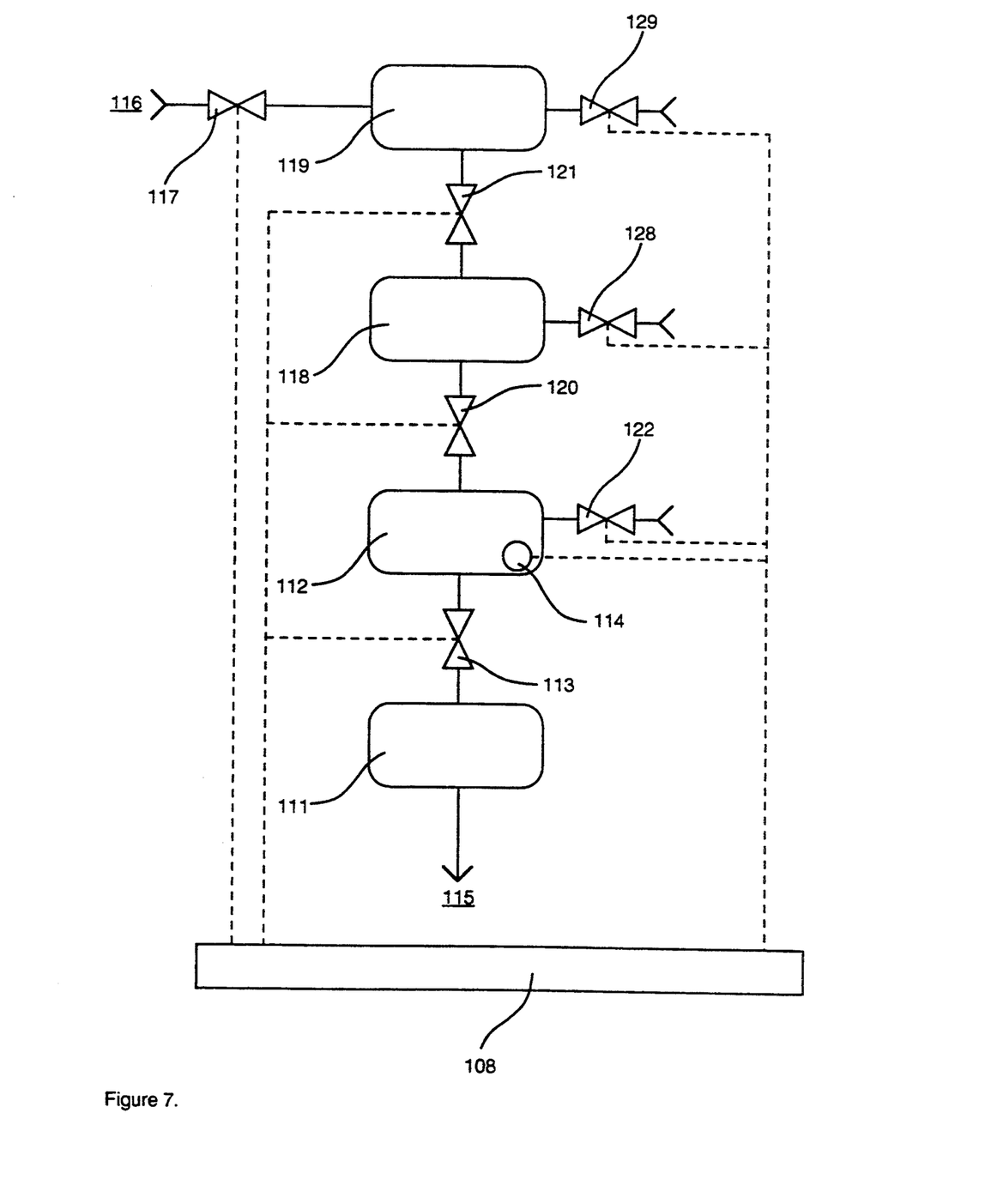

Referring now to FIG. 7 a fluid pressure control system is shown which comprises a chamber 111 which can be connected to a chamber 112 through a valve 113. A pressure transducer 114 is situated in chamber 112 and will indicate the pressure in chamber 111 when valve 113 is open and the pressures have equalised. If the pressure in the chamber 111 falls below a required level, valve 113 is closed and chamber 112 is raised to a pressure higher than the pressure required in chamber 111, valve 113 is then opened and the higher pressure of chamber 112 is discharged into chamber 111. This delivers a pulse or discrete step of pressure into chamber 111 which increases the pressure in chamber 111 by an amount which depends on the pressures then in chambers 111 and 112, as these two chambers are of equal volume.

Chamber 111 is used to supply fluid through an outlet 115 to operate equipment which is not shown in the drawings but which needs a pressure supply which can be controllably varied as required.

The pressure supply to chamber 112 comes from a pressure source 116 through a valve 117 and two additional chambers 118 and 119 are connected in the system with valves 120, 121. The chambers 111, 112, 118 and 119 may all be of equal volume but are not necessarily equal. Chambers 112, 118 and 119 are capable of being exhausted to atmosphere through respective valves 122, 128 and 129. Chambers 112, 118 and 119 are used to provide a wide variation in the pressure available in chamber 112 for delivery as a pulse or step to chamber 111.

For example, valves 117, 121 and 120 can be opened and chambers 112, 118 and 119 all filled to the inlet pressure of source 116. When valve 117 is closed and valve 113 opened, this will produce a large increase in the pressure in chamber 111, depending on the starting pressure in chamber 111 and its relationship to the pressure in source 116.

Alternatively, chamber 119 alone can be charged to the inlet pressure of source 116 by keeping valve 121 closed. Then by closing valve 117 and opening valve 121, having first exhausted chamber 118, the pressure in chamber 119 can be equilibriated between chambers 119 and 118 producing a pressure in these two chambers lower than the inlet pressure from source 116. By closing valve 121 the pressure in chamber 118 can be equilibriated between chambers 118 and 112 and a pressure pulse or step of much lower pressure than the inlet pressure from source 116 can delivered to chamber 111.

As a further alternative, chamber 119 alone can be charged to the inlet pressure of source 116 by keeping valve 121 closed. Then by closing valve 117 and opening valve 121, having first exhausted chamber 118, the pressure in chamber 119 can be equilibriated between chambers 119 and 118 producing a pressure in these two chambers lower than the inlet pressure from source 116. By then successively exhausting chamber 118 to atmosphere and equilibriating it with chamber 119, an even lower pressure can be produced. The chambers thus act as pressure dividers to produce pulses of pressure which are lower than the pressure of source 116. The opening and closing of all the valves are controlled by a control system 108 and, because of the multiplicity of chambers and valves, this control system can be preparing a pulse of a desired pressure in chamber 118 whilst still delivering the previous pulse from chamber 112 to chamber 111.

In the specification the terms "pulse" and "step" are used. These two terms are used synonymously to mean the delivery of a finite amount of fluid into or out of a chamber.

We claim:

1. A fluid pressure control system comprising
a first chamber, the pressure in which is to be controlled;
a second chamber;
valve means for controlling communication between said first and second chambers; and
a controller arranged such that, if the pressure in said first chamber differs from a required pressure, said controller:
 i) operates said valve means to close off communication between said first and second chambers,
 ii) varies the pressure in said second chamber,
 iii) opens communication between said first and second chambers to deliver a discrete pressure step to said first chamber, and,
 iv) repeats i) to iii) until the pressure in said first chamber reaches a required level.

2. A pressure control system as claimed in claim 1, including a third chamber and means for bringing said second and third chambers into communication whereby in ii) variation of the pressure in said second chamber also varies the pressure in said third chamber.

3. A pressure control system as claimed in claim 1, including a third chamber and means for bringing said second and third chambers into communication whereby after ii) said second chamber is brought into communication with the third chamber so as to vary the pressure in said second chamber and thereby the pressure of said discrete pressure step to be delivered to said first chamber.

4. A pressure control system as claimed in claim 3, including means for evacuating said third chamber whereby to reduce its pressure before putting it into communication with said second chamber.

5. A pressure control system as claimed in claim 3, in which two said first chambers are provided, one arranged to operate at a different required pressure from the other and both having means for communicating with said second chamber.

6. A pressure control system as claimed in claim 3, including a fourth chamber capable of being brought into communication with said third chamber.

7. A pressure control system as claimed in claim 1, including pressure measuring means positioned in said second chamber.

8. A pressure control system as claimed in claim 1, wherein the volume of the second chamber in of the order of 1:200 in relation to the volume of the first chamber.

9. A system for providing a fluid output at a precisely controlled pressure comprising
a first chamber having a first volume, said first chamber having an outlet for discharging fluid at a predetermined pressure;
a second chamber having a second volume, said second volume being less than said first volume;
a pressure transducer positioned within one of said first and second chambers to provide an output corresponding to the pressure therein;
a first valve interconnecting said first and second chambers;
a second valve interposed between a source of pressure and said second chamber; and
a control unit coupled to said pressure transducer and said first and second valves, said control unit controlling the opening and closing of said valves in response to a signal from said pressure transducer.

10. A system for providing a fluid output at a precisely controlled pressure as claimed in claim 9 which further comprises
a third chamber;
a third valve interconnecting said second and third chambers; and
a fourth valve connected to said second chamber for exhausting said second chamber to waste, the opening and closing of said third and fourth valves being controlled by said control unit.

11. A method of providing a fluid output at a precisely controlled pressure from the outlet of a first chamber interconnected to a second chamber, said second chamber having a volume less than that of said first chamber, comprising the steps of
closing off communication between said first and second chambers when the pressure in said first chamber is lower than a predetermined level;
introducing fluid into said second chamber until the pressure therein reaches a predetermined inlet pressure;
restoring communication between said first and second chambers to deliver a pulse of fluid from said second chamber to said first chamber; and
repeating said steps until the pressure in said first chamber reaches said predetermined level.

12. A method of operating a pressure control system comprising valve means for controlling communication between first and second chambers, the method comprising the steps of:
 i) operating said valve means to close off communication between said first and second chambers;
 ii) varying the pressure in said second chamber;
 iii) opening communication between said first and second chambers to deliver a discrete pressure step to said first chamber; and,
 iv) repeating steps i) to iii) until the pressure in said first chamber reaches the required level.

* * * * *